United States Patent
Janson

(10) Patent No.: US 8,672,068 B2
(45) Date of Patent: Mar. 18, 2014

(54) DRIVE UNIT FOR AN ELECTRIC HYBRID VEHICLE

(71) Applicant: Ford Global Technologies, LLC, Dearborn, MI (US)

(72) Inventor: David A. Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/034,708

(22) Filed: Sep. 24, 2013

(65) Prior Publication Data

US 2014/0031159 A1   Jan. 30, 2014

Related U.S. Application Data

(62) Division of application No. 12/019,696, filed on Jan. 25, 2008, now Pat. No. 8,567,540.

(51) Int. Cl.
 *B60K 6/50* (2007.10)

(52) U.S. Cl.
 USPC ............ 180/65.22; 180/65.6; 475/4; 903/910

(58) Field of Classification Search
 USPC ........ 180/65.22, 65.23, 65.26, 65.265, 65.51; 475/1, 5, 150, 221; 903/910, 911, 915
 See application file for complete search history.

(56) References Cited

U.S. PATENT DOCUMENTS

| | | | | |
|---|---|---|---|---|
| 6,155,364 | A * | 12/2000 | Nagano et al. | 180/65.235 |
| 6,945,347 | B2 * | 9/2005 | Matsuno | 180/242 |
| 7,520,354 | B2 * | 4/2009 | Morrow et al. | 180/65.31 |
| 7,530,421 | B2 * | 5/2009 | Mori et al. | 180/248 |
| 7,661,495 | B2 * | 2/2010 | Zohrer et al. | 180/65.22 |
| 2006/0079370 | A1 * | 4/2006 | Kushino | 475/221 |
| 2007/0093344 | A1 * | 4/2007 | Kira et al. | 475/150 |
| 2007/0102209 | A1 * | 5/2007 | Doebereiner | 180/65.4 |
| 2009/0197727 | A1 * | 8/2009 | Janson | 475/5 |

* cited by examiner

*Primary Examiner* — John Walters
(74) *Attorney, Agent, or Firm* — James Dottavio; MacMillan, Sobanski & Todd, LLC

(57) ABSTRACT

A drive unit for a hybrid electric motor vehicle includes a bevel pinion driveably connected to a power source, a bevel gear meshing with the bevel pinion and aligned with an axis, first and second drive shafts, a differential mechanism including an input secured to the bevel gear for transmitting power between the input and the first and the second drive shafts, an electric motor/generator including a rotor, and a planetary gear set driveably connected to the input and the rotor for transmitting power between the rotor and the input such that a speed of the rotor is greater than a speed of the input.

6 Claims, 4 Drawing Sheets

DRIVE UNIT FOR AN ELECTRIC HYBRID VEHICLE

CROSS REFERENCE TO RELATED APPLICATIONS

The present application is a divisional of and claims the benefit of pending U.S. patent application Ser. No. 12/019,696 filed Jan. 25, 2008, which is incorporated herein by reference.

BACKGROUND OF THE INVENTION

1. Field of the Invention

This invention relates generally to a powertrain for a vehicle, and, more particularly, to a powertrain having multiple power sources including an electric motor for driving a set of vehicle wheels.

2. Description of the Prior Art

Hybrid electric powertrains have been developed that include an electric motor and an internal combustion (IC) engine that can operate independently or in combination depending on the driving conditions, the state of charge of a traction battery, and the power source that most efficiently meets the current power demands imposed by the vehicle operator.

Most electric hybrid vehicles available commercially are front wheel drive vehicles, in which only the front wheels are driven. Hybrid electric powertrains, being developed for use in four-wheel drive vehicles, allow both the motor and engine to transmit power to a rear set of driven wheels.

When packaging an electric motor drive unit for a rear axle it is preferable to place the motor drive unit on the rear axle centerline for best packaging efficiency. The engine is located at the front to the vehicle in the engine compartment. Such electric hybrid drive systems, however, present packaging difficulties to the vehicle designer, particularly when layshaft gearing is used to transmit power from a longitudinal drive shaft to a rear axle. A ring and pinion mechanical drive, similar to an axle drive, will operate without layshaft gearing.

A need exists for a low-cost, hybrid electric powertrain in which one axle is driven by an electric motor or an IC engine in combination with the motor. To minimize cost, an electric machine would provide all hybrid functions including electric energy generation, electric vehicle launch, engine starting, electric boosting of engine power, and regenerative braking.

SUMMARY OF THE INVENTION

A drive unit for a hybrid electric motor vehicle includes a bevel pinion driveably connected to a power source, a bevel gear meshing with the bevel pinion and aligned with an axis, first and second drive shafts, a differential mechanism including an input secured to the bevel gear for transmitting power between the input and the first and the second drive shafts, an electric motor/generator including a rotor, and a planetary gear set driveably connected to the input and the rotor for transmitting power between the rotor and the input such that a speed of the rotor is greater than a speed of the input.

The ring and pinion mechanical drive, which is similar to an axle drive, allows the layshaft gearing to be removed.

A torque reaction member of the planetary gear set is secured to a casing against rotation, and a drum, which is secured to the gear, surrounds the planetary gear set. This arrangement minimizes the package space required to contain the drive unit.

The location of the drum and bevel gear facilitates their being supported on the casing for rotation. The layshaft gearing includes a minimum number of components.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
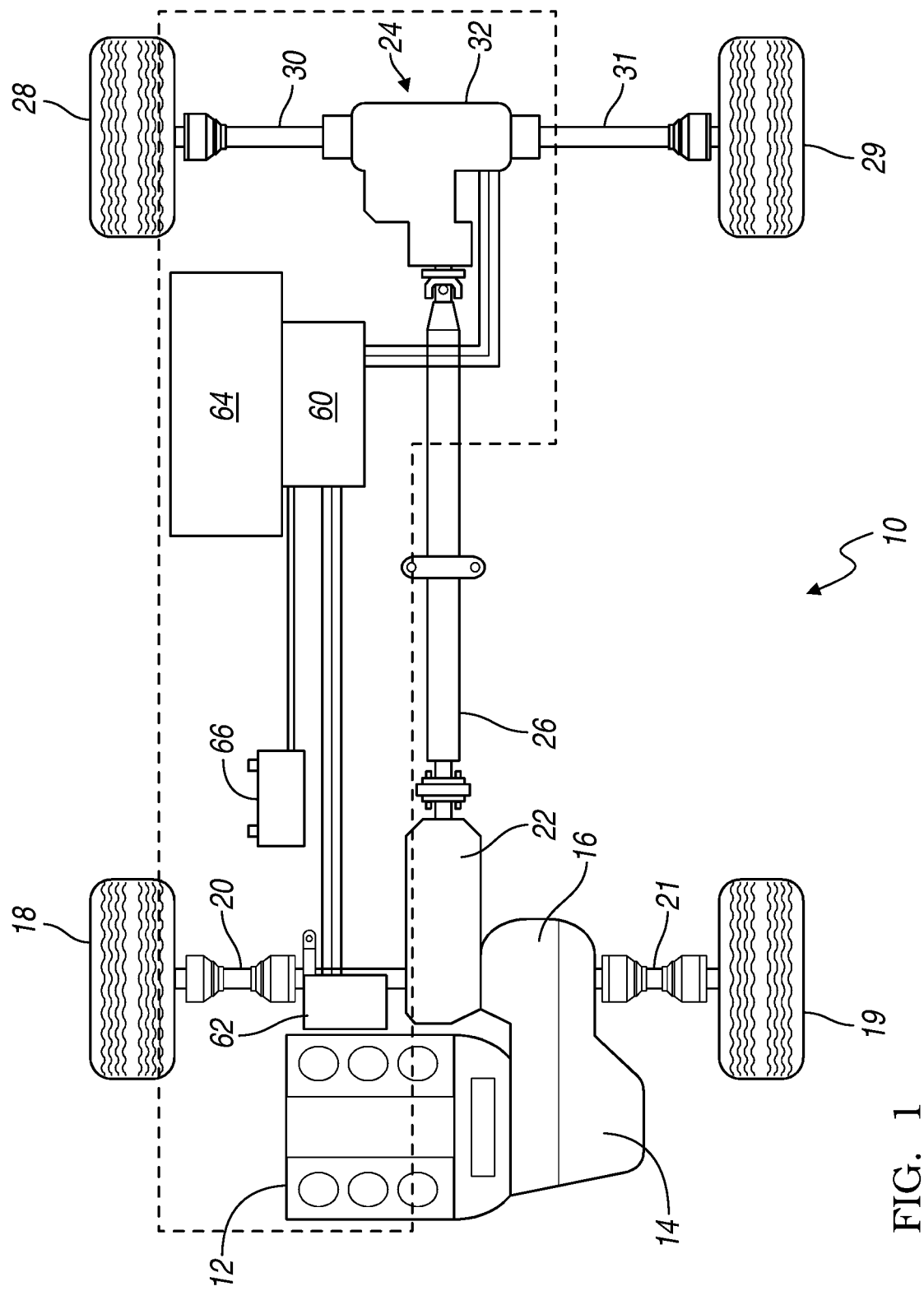
FIG. 1 is a schematic diagram of a powertrain for a hybrid electric vehicle, whose rear axle shafts are driven by an electric rear axle drive unit.

The powertrain 10 for a hybrid electric motor vehicle illustrated in FIG. 1 includes an IC engine 12, a transmission 14, which drives a front final drive unit 16, driveably connected to a pair of front wheels 18, 19 by front drive shafts 20, 21. Transmission 14 may be a manual gearbox or any type of automatic transmission. The front final drive unit 16 also drives a rear drive take-off unit 22, which is connected to a rear final drive unit 24, i.e., the ERAD unit, by a longitudinal prop shaft 26. The ERAD unit 24 is driveably connected to a pair of rear wheels 28, 29 by rear drive shafts 30, 31. The ERAD unit 24 includes a casing 32, which contains the inboard ends of the rear drive shafts 30, 31.

Figure 2:
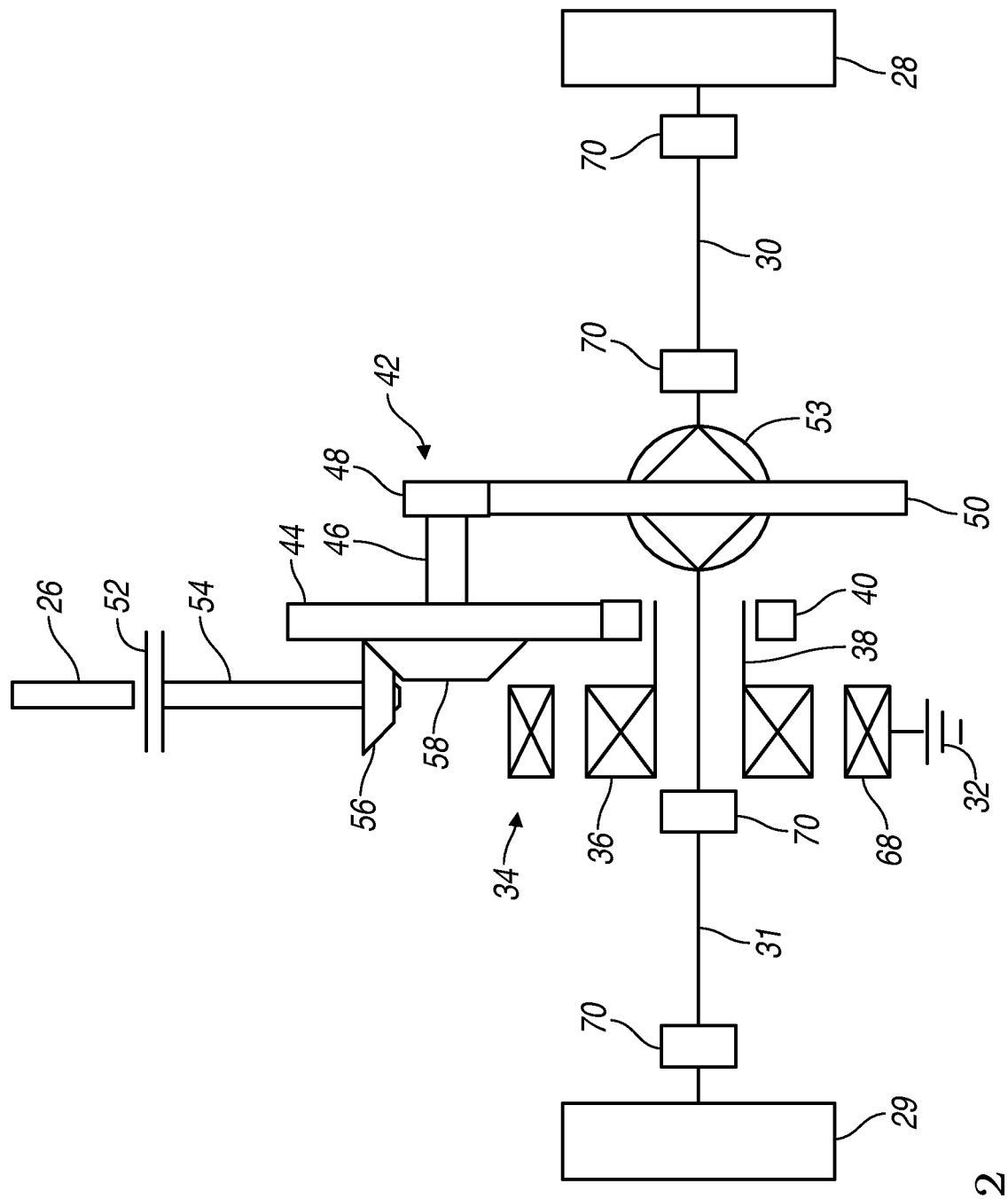
FIG. 2 is schematic diagram of the electric rear axle drive unit of FIG. 1.

FIG. 2 shows a motor/generator 34 arranged transversely in the final drive unit 24. The motor/generator 34 includes a hollow rotor 36, which is connected by a sleeve shaft 38 to an input pinion 40 of a layshaft reduction gear train 42. Input gear 40 meshes with a large diameter gear 44 secured to a layshaft 46, which also has a small diameter pinion 48 secured to it. The small diameter pinion 48 meshes with a large diameter driving gear 50, secured to an inter-wheel differential mechanism 53, which drives the rear wheels 28, 29 through drive shafts 30, 31. Drive shaft 31 extends concentrically through the rotor 36 and the sleeve shaft 38.

A coupler or clutch 52 alternately opens and closes a drive connection between prop shaft 26 and input shaft 54, which is secured to a final drive bevel pinion 56. A bevel gear 58 meshes with bevel pinion 56 and is secured to the large diameter gear 44.

The motor/generator 34 is controlled by an electronic control unit (ECU) 60. Electric power and rotating power are generated by the motor/generator 34 and by an integrated starter-generator 62, which alternately drives and is driven by the engine 12. Both the motor/generator 34 and the integrated starter-generator 62 alternately draw electric current from and supply electric current to a traction battery 64 and an auxiliary battery 66. The traction battery 64 is a high voltage unit; the auxiliary battery 66 is a 12V unit for the supply & control of the vehicle electrical systems.

The engine 12 drives the front wheels 18, 19 through transmission 14, the front final drive unit 16 and the front drive shafts 20, 21, while also driving the rear wheels 28, 29 through the rear take-off unit 22, prop shaft 26, the ERAD unit 24 and the rear drive shafts 30, 31. The torque capacity of coupler 52 varies such that it transmits a magnitude of torque to the rear wheels 28, 29 as required to maintain an appropriate torque split between the front and rear wheels. Under low vehicle speed driving conditions, the electric motor/generator 34 drives the vehicle with the engine 12 stopped, in which case the coupler 52 is disengaged and the rear wheels 28, 29 are driven only through the layshaft reduction gear train 42.

When motor/generator 34 drives the rear wheels 28, 29, sleeve shaft 38 transmits power from rotor 36 to pinion 40, which drives the large diameter gear 44, layshaft 46 and pinion 48. The input of differential mechanism 53 is driven by large diameter driving gear 50. Under heavier load at low vehicle speed, the motor/generator 34 can supplement power produced by the engine 12.

At higher vehicle speed, engine 12 is the power source for driving the wheels, and the integrated starter generator 62 and the electric motor generator 34 supply electric power to the batteries 64, 66.

The layshaft reduction gear train 42 provides a reduction speed ratio between the motor/generator 34 and the differential 53 as well as providing a reduction speed ratio between input shaft 54 and the differential 53. The layshaft reduction gear train 42, therefore, performs the dual task of providing speed reduction gearing for both the electric motor/generator 34 and the mechanical torque path from the engine 12.

Casing 32 supports the various shafts and gear elements of the layshaft reduction gear train 42 and the stator 68 of the motor/generator 34. The drive shafts 30, 31 each comprise an inner shaft extending inside the casing 32, an outer shaft outside the casing 32 extending towards a respective rear wheel 28, 29, and universal joints 70 connecting the inner and outer shafts and the respective wheel.

Figure 3:
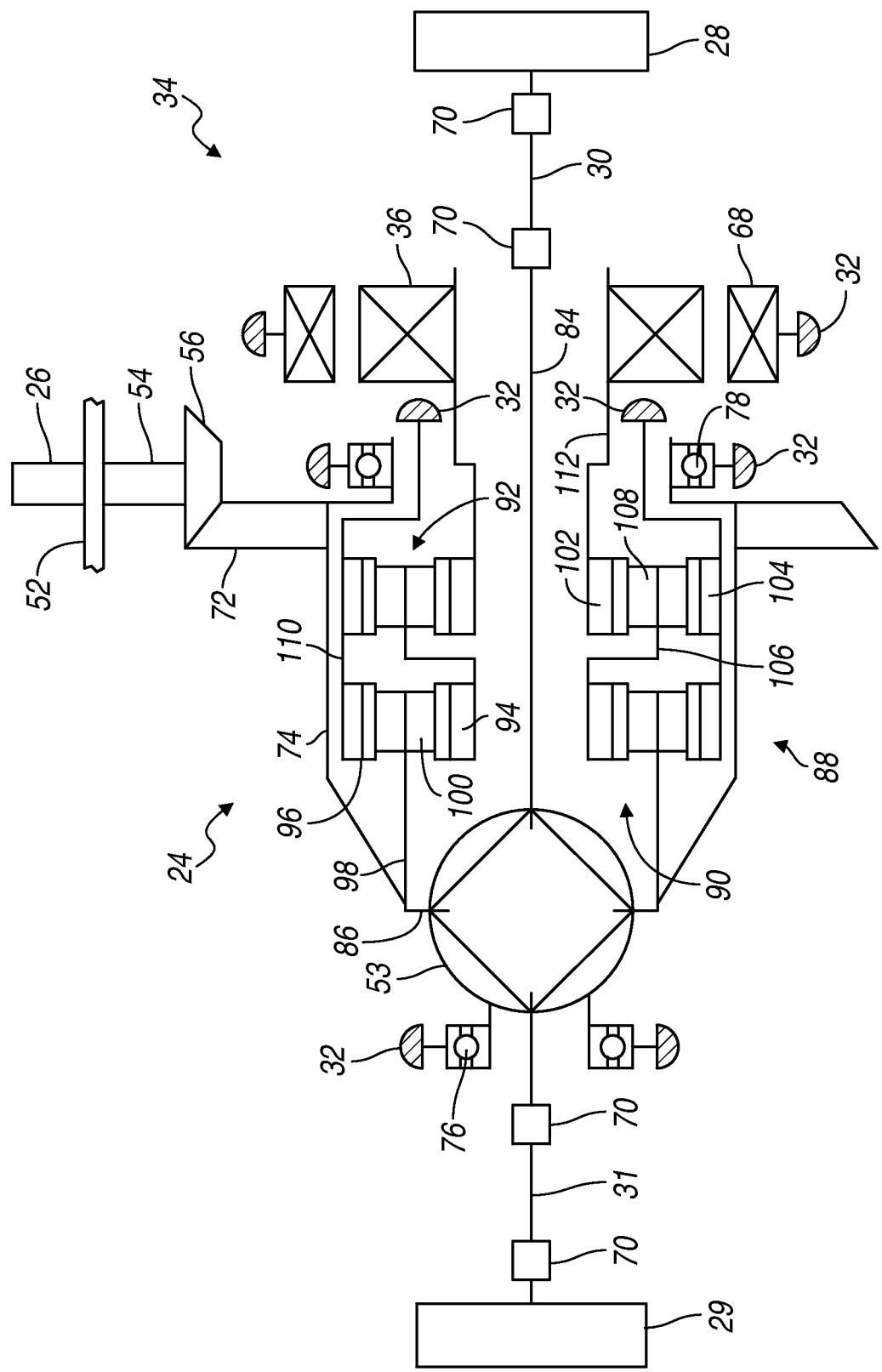
FIG. 3 is a schematic diagram of a second embodiment of the electric rear axle drive unit.

In the ERAD unit 24 illustrated in FIG. 3, bevel pinion 56 meshes with a bevel gear 72, which is secured to a drum 74. Bearings 76, 78, fitted into casing 32, support drum 74 in rotation about a lateral axis 84, which is concentric with shafts 30, 31. Drum 74 is driveably connected to the input 86 of differential mechanism 53.

A speed reduction planetary gear unit 88 includes two interconnected planetary gear sets 90, 92. Gear set 90 includes sun gear 94; ring gear 96; carrier 98, secured to differential input 86; and a set of planet pinions 100, supported for rotation on carrier 98 and meshing with ring gear 96 and sun gear 94. Gear set 92 includes a second sun gear 102; second ring gear 104; carrier 106; and a second set of planet pinions 108, supported for rotation on carrier 106 and meshing with ring gear 104 and sun gear 102. Ring gears 96, 104 are mutually connected by a drum 110, which is grounded on casing 32. Sun gear 94 is secured to carrier 106 for rotation as a unit. Sun gear 102 is driveably connected by a shaft 112 to the rotor 36 of motor/generator 34.

The angular velocity of sun gear 94 is about three times greater than that of carrier 98, and the angular velocity of sun gear 102 is about three times greater than that of carrier 106. Therefore, shaft 112 rotates about nine times faster than the speed of bevel gear 72, drum 74 and differential input 86.

Differential 53 may be of the type comprising a ring gear that rotates about axis 84, a spindle driven by the ring gear and revolving about axis 84, bevel pinions secured to the spindle for revolution therewith and for revolution about the axis of the spindle, and side bevel gears meshing with the bevel gears, each side bevel gear being secured to one of the shafts 30, 31.

Figure 4:
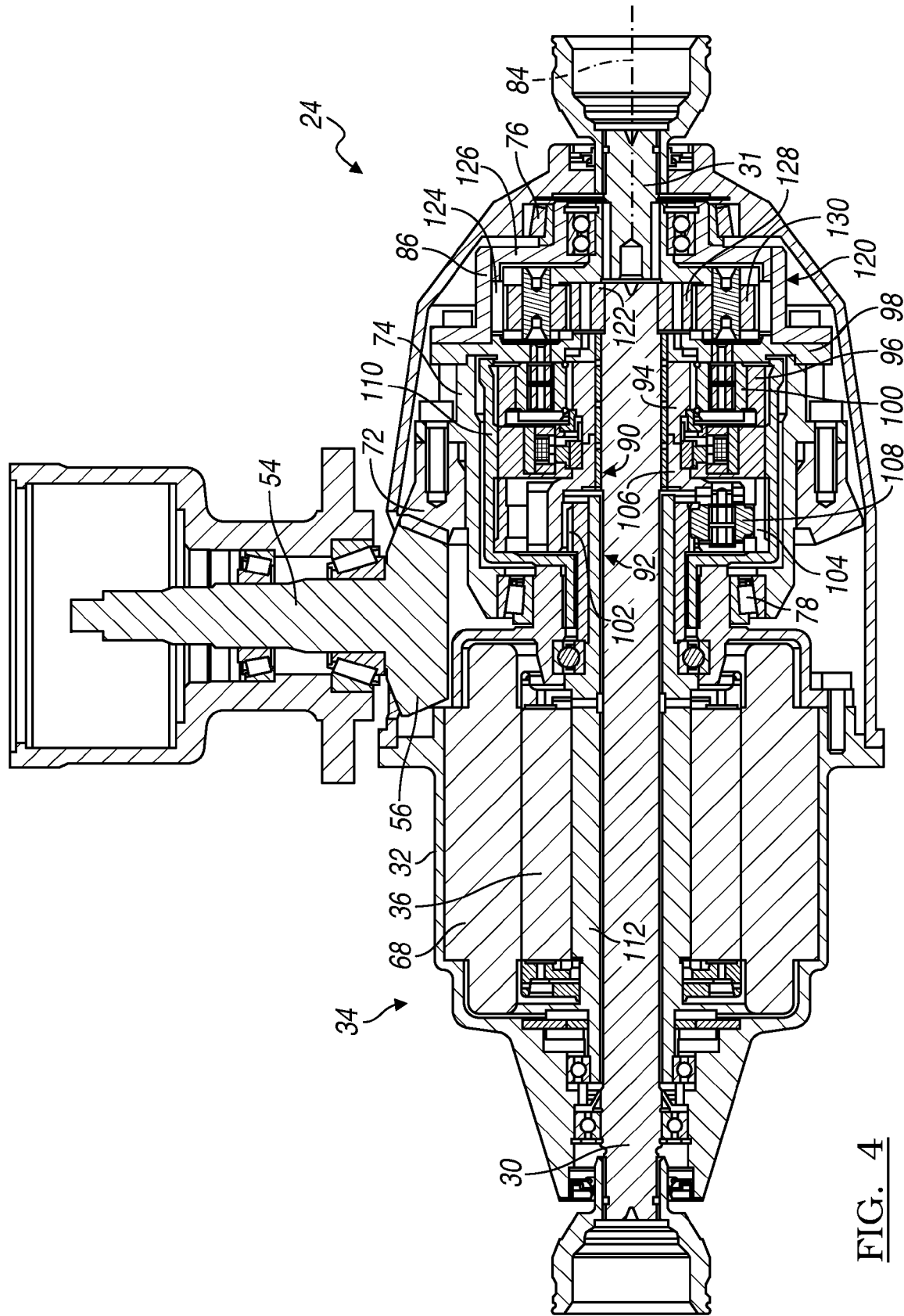
FIG. 4 is a bottom cross sectional view of the electric rear axle drive unit shown in FIG. 3.

As FIG. 4 shows, the differential mechanism 53 may be a planetary differential mechanism 120, which includes a third sun gear 122 driveably connected to drive shaft 30; third ring gear 124, secured by differential input 86 and drum 74 to bevel gear 72; third carrier 126, driveably connected to drive shaft 31; a third set of planet pinions 128, supported for rotation on carrier 126 and meshing with sun gear 122; and a fourth set of planet pinions 130, supported for rotation on carrier 126 and meshing with ring gear 124 and the planet pinions 128.

A path for transmitting power from engine 12 to the rear axle drive unit 24 includes transmission 14, rear drive take-off unit 22, and prop shaft 26. A first power path within ERAD unit 24 transmits power from prop shaft 26 through coupler 52, bevel pinion 56, bevel gear 72, drum 74 and differential mechanism 53, 120 to the rear axle shafts 30, 31 and rear wheels 28, 29.

When coupler 52 is open and the motor/generator 34 is operating as an electric motor, a second power path within ERAD unit 24 transmits power from the rotor 36 of the motor/generator 34 through shaft 112, gear set 92, carrier 106, gear set 90, carrier 98 and differential mechanism 53, 120 to the rear axle shafts 30, 31 and rear wheels 28, 29.

When coupler 52 is open and the motor/generator 34 is operating as an electric generator, power from the rear wheels 28, 30 is transmitted in a reverse direction through the second power path to drive the rotor 36 so that the motor/generator 34 can generate electric current.

The coupler 52 may be located in the front drive take-off unit 22 instead of in the ERAD unit 24. The front drive take-off unit 22 may incorporate a center differential, which continually splits the torque between the front wheels 18, 19 and the rear wheels 28, 29, in which case clutch 52 may be omitted.

Although the powertrain 10 has been described as having the engine 12 at the vehicle front, the engine and transmission 14 may be located at the rear of the vehicle or the engine may be located at the front and arranged along the longitudinal axis of the vehicle with a transmission located behind the engine. References to "front" and "rear" in this description are used primarily to describe the relative positions of components.

In accordance with the provisions of the patent statutes, the preferred embodiment has been described. However, it should be noted that the alternate embodiments can be practiced otherwise than as specifically illustrated and described.

The invention claimed is:

1. A drive unit for a hybrid electric motor vehicle comprising:
   a bevel pinion driveably connected to a power source;
   a bevel gear meshing with the bevel pinion and aligned with an axis;
   a first driveshaft and a second driveshaft;
   a differential mechanism including an input secured to the bevel gear, for transmitting power between the input and the first and the second drive shafts;
   an electric motor/generator including a rotor; and
   a planetary gear set driveably connected to the input and the rotor for transmitting power between the rotor and the input such that a speed of the rotor is greater than a speed of the input.

2. The drive unit of claim 1 wherein the planetary gear set further comprises:

a first sun gear driveably connected to the rotor, a first ring gear held against rotation, a first carrier driveably connected to the input, and first planet pinions supported for rotation on the first carrier and meshing with the first sun gear and the first ring gear.

3. The drive unit of claim 1 wherein:
the planetary gear set further comprises a first sun gear driveably connected to the rotor, a first ring gear held against rotation, a first carrier, and first planet pinions supported for rotation on the first carrier and meshing with the first sun gear and the first ring gear; and
the gear unit further comprises a second the planetary gear set that includes a second sun gear driveably connected to the first carrier, a second ring gear held against rotation, a second carrier driveably connected to the input, and second planet pinions supported for rotation on the second carrier and meshing with the second sun gear and the second ring gear.

4. The drive unit of claim 1 wherein:
the motor/generator further comprises a stator surrounding the rotor;
the planetary gear set includes a non-rotating member; and
the drive unit further comprises a casing fixed against rotation, the stator and non-rotating member being secured to the casing.

5. The drive unit of claim 1 wherein the differential mechanism further comprises:
a third sun gear driveably connected to the first drive shaft;
a third ring gear driveably connected to the input;
a third carrier driveably connected to the second drive shaft;
third planet pinions supported for rotation on the third carrier and meshing with the third sun gear; and
fourth planet pinions supported for rotation on the third carrier and meshing with the third ring gear and the third planet pinions.

6. The drive unit of claim 1 wherein the differential mechanism and the planetary gear set are substantially aligned with the axis and the differential mechanism is spaced along the axis from the planetary gear set;
the drive unit further comprising:
a casing fixed against rotation;
a first bearing located at a lateral side of the differential mechanism that is axially opposite the location of the planetary gear set, and supporting the gear unit on the casing for rotation about the axis; and
a second bearing located at a lateral side of the differential gear set that is axially opposite the location of the differential mechanism, and supporting the gear unit on the casing for rotation about the axis.

* * * * *